(12) United States Patent
Kuze et al.

(10) Patent No.: US 6,350,847 B1
(45) Date of Patent: Feb. 26, 2002

(54) POLYCARBONATE RESIN COMPOSITION AND PRODUCTS OF SHEET FORMING THEREOF

(75) Inventors: Shigeki Kuze; Hiroshi Akamine; Jiro Chiba, all of Ichihara (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 09/720,794

(22) PCT Filed: Aug. 19, 1999

(86) PCT No.: PCT/JP99/04451

§ 371 Date: Dec. 29, 2000

§ 102(e) Date: Dec. 29, 2000

(87) PCT Pub. No.: WO00/17271

PCT Pub. Date: Mar. 30, 2000

(30) Foreign Application Priority Data

Sep. 18, 1998 (JP) .......................................... 10-265190

(51) Int. Cl.$^7$ ................................................ C08G 64/00
(52) U.S. Cl. ...................................... 528/196; 528/198
(58) Field of Search .................................. 528/196, 198

(56) References Cited

FOREIGN PATENT DOCUMENTS

| EP | 15230 | * | 9/1980 |
| WO | WO94/05645 | * | 3/1994 |

* cited by examiner

*Primary Examiner*—Terressa M. Boykin
(74) *Attorney, Agent, or Firm*—Oblon, Spivak, McClelland, Maier & Neustadt, P.C.

(57) ABSTRACT

Provided are a polycarbonate resin composition comprising 100 parts by weight of a polycarbonate and from 0.001 to 15 parts by weight of a benzotriazole-type UV absorbent and/or a benzophenone-type UV absorbent, and having a sulfur content of at most 50 ppb; and its sheet moldings. The resin composition and its sheet moldings have good weather resistance and heat stability.

3 Claims, No Drawings

POLYCARBONATE RESIN COMPOSITION AND PRODUCTS OF SHEET FORMING THEREOF

TECHNICAL FIELD

The present invention relates to a UV absorbent-containing polycarbonate resin composition and its sheet moldings. Precisely, the invention relates to such a polycarbonate resin composition having the advantages of good weather resistance and heat stability and capable of forming moldings with few colored impurities, and to sheet moldings of the composition.

BACKGROUND ART

As being transparent and having good heat resistance and impact resistance, polycarbonates are used in various fields of the art of resin molding, in which, however, high-temperature thermoforming has become popularized to meet the recent tendency toward large-sized and thin-walled resin moldings and toward shortened molding cycles. With that, polycarbonates are often problematic in that they are readily degraded through oxidation, discolored (yellowed) and foamed, and that the mechanical strength of their moldings is thereby lowered. Another problem with polycarbonates is that their moldings are often discolored and aged when exposed to the weather in outdoor use or to fluorescent lights in indoor use, and the mechanical strength of the aged moldings is lowered.

To solve the problems, for example, adding UV absorbents to polycarbonates has been proposed (Japanese Patent Publication Nos. 51840/1994, 45228/1994). However, the method proposed is still problematic in that the resin moldings produced therein often have gels (fish eyes) and their heat stability is still unsatisfactory, though being effective in some degree for improving the weather resistance of the resin moldings.

The object of the present invention is to provide a polycarbonate resin composition having good weather resistance and heat stability and to provide sheet moldings of the composition.

DISCLOSURE OF THE INVENTION

We, the present inventors have assiduously studied the problems noted above. We know that many typical UV absorbents for polycarbonates, such as benzotriazole-type UV absorbents and benzophenone-type UV absorbents are contaminated with sulfonic acid group-having compounds that are derived from their starting materials, and the concentration of the contaminants in them is high. It is therefore presumed that such sulfonic acid group-having compounds in those UV absorbents may cause oxidative degradation of polycarbonates. To confirm the fact, we made various experiments, and, as a result, have reached the present invention. Incidentally, we have found through our experiments that, when the hydroxyl content of the both terminals of the polymer chain of polycarbonates is higher than a predetermined level, then the polycarbonate moldings often have many gels (fish eyes). Based on these, we have completed the invention, which is summarized as follows:

[1] A polycarbonate resin composition comprising (A) 100 parts by weight of a polycarbonate and (B) from 0.001 to 15 parts by weight of one or more UV absorbents selected from benzotriazole-type UV absorbents, benzophenone-type UV absorbents and triazine-type UV absorbents, which is characterized in that the sulfur content of the composition is at most 50 ppb.

[2] The polycarbonate resin composition of above [1], wherein the hydroxyl content of the both terminals of the polymer chain of the polycarbonate (A) is at most 10 mol %.

[3] A sheet molding of the polycarbonate resin composition of above [1] or [2], which is produced through extrusion molding of the composition.

BEST MODES OF CARRYING OUT THE INVENTION [Benzotriazole-type UV absorbents, benzophenone-type UV absorbents, triazine-type UV absorbents]

Benzotriazole-type UV absorbents for use in the invention are typically compounds of the following formula (I):

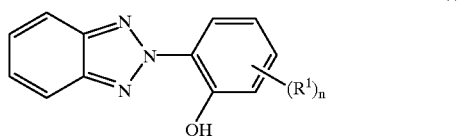

wherein n is 1 or 2; and $R^1$ indicates an alkyl group having from 1 to 10 carbon atoms.

Concretely, they include the following:

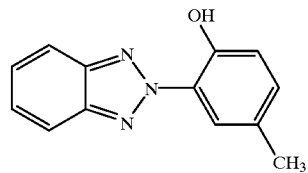

2-(2'-hydroxy-5'-methylphenyl)benzotriazole;

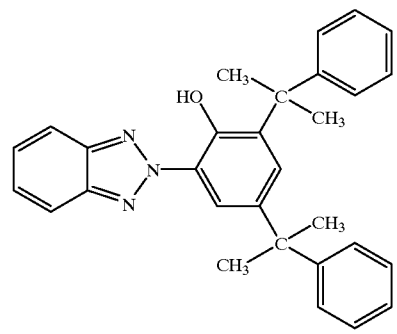

2-[2'-hydroxy-3',5'-bis($\alpha,\alpha$-dimethylbenzyl)phenyl]benzotriazole;

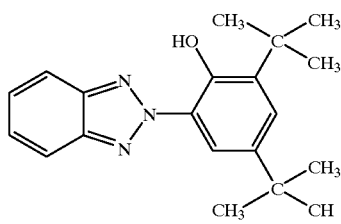

2-(2'-hydroxy-3',5'-di-t-butylphenyl)benzotriazole;

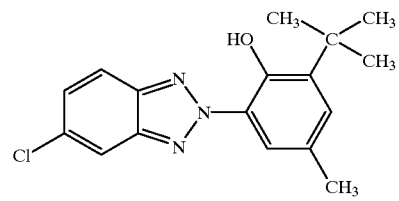

2-(2'-hydroxy-3'-t-butyl-5'-methylphenyl)-5-chlorobenzotriazole;

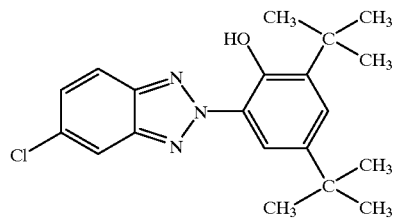

2-(2'-hydroxy-3',5'-di-t-butylphenyl)-5-chlorobenzotriazole;

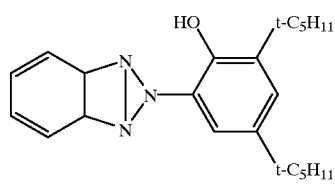

2-(2'-hydroxy-3',5'-di-t-amyl)benzotriazole;

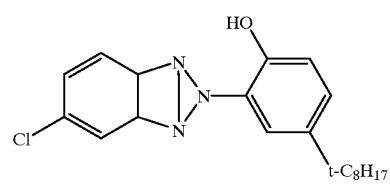

2-(2'-hydroxy-5'-t-octylphenyl)benzotriazole;

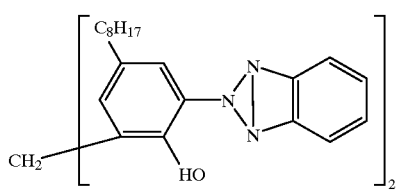

2,2'-methylene-bis[4-(1,1,3,3-tetramethylbutyl)-6-(2N-benzotriazol-2-yl)phenol].

Benzophenone-type UV absorbents for use in the invention are typically compounds of the following formula (II):

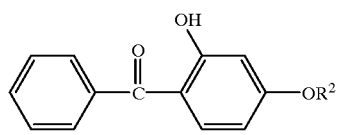

(II)

wherein $R^2$ indicates an alkyl group having from 1 to 15 carbon atoms.

Concretely, they include the following:

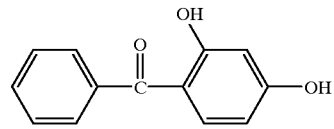

2,4-dihydroxybenzophenone;

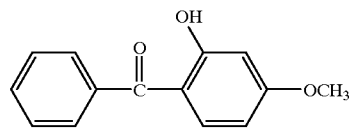

2-hydroxy-4-methoxybenzophenone;

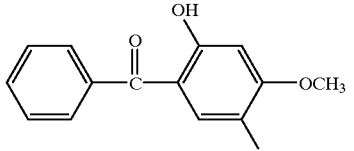

2-hydroxy-4-methoxybenzophenone-5-sulfonic acid;

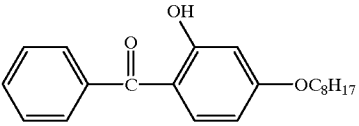

2-hydroxy-4-n-octoxybenzophenone;

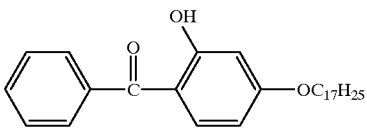

2-hydroxy-4-n-dodecyloxybenzophenone;

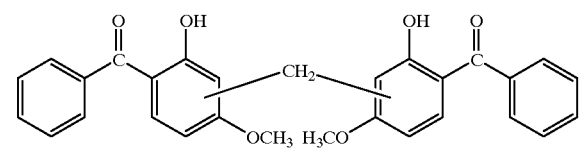

bis(5-benzoyl'-4-hydroxy-2-methoxyphenyl)methane;

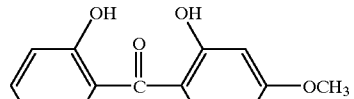

2,2'-dihydroxy-4-methoxybenzophenone;

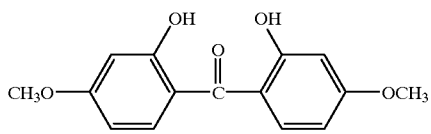

2,2'-dihydroxy-4,4'-dimethoxybenzophenone.

Triazine-type UV absorbents for use in the invention are typically compounds of the following formula (III):

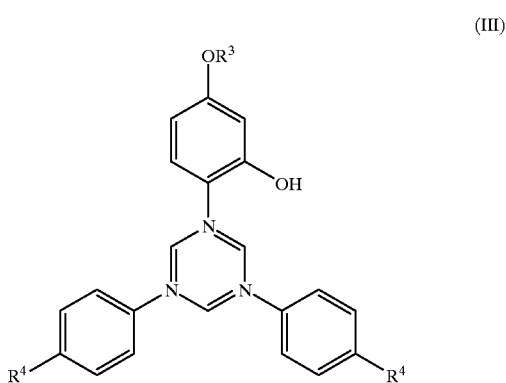

(III)

wherein $R^3$ indicates a hydrogen atom, an alkyl group having from 1 to 18 carbon atoms, an alkyl group having from 2 to 6 carbon atoms and substituted with a halogen atom or an alkoxy group having from 1 to 12 carbon atoms, or a benzyl group; $R^4$ indicates a hydrogen atom or a methyl group.

Concretely, they include 2,4-diphenyl-6-(2-hydroxy-4-methoxyphenyl)-1,3,5-triazine, 2,4-diphenyl-6-(2-hydroxy-4-ethoxyphenyl)-1,3,5-triazine, 2,4-diphenyl-6-(2-hydroxy-4-propoxyphenyl)-1,3,5-triazine, 2,4-diphenyl-6-(2-hydroxy-4-butoxyphenyl)-1,3,5-triazine, 2,4-diphenyl-6-(2-hydroxy-4-hexyloxyphenyl)-1,3,5-triazine, 2,4-diphenyl-6-(2-hydroxy-4-pentoxyphenyl)-1,3,5-triazine, 2,4-diphenyl-6-(2-hydroxy-4-octyloxyphenyl)-1,3,5-triazine, 2,4-diphenyl-6-(2-hydroxy-4-dodecyloxyphenyl)-1,3,5-triazine, 2,4-diphenyl-6-(2-hydroxy-4-benzyloxyphenyl)-1,3,5-triazine, 2,4-diphenyl-6-(2-hydroxy-4-(2-butoxyethoxy)phenyl)-1,3,5-triazine, 2,4-di-p-tolyl-6-(2-hydroxy-4-methoxyphenyl)-1,3,5-triazine, 2,4-di-p-tolyl-6-(2-hydroxy-4-propoxyphenyl)-1,3,5-triazine, 2,4-di-p-tolyl-6-(2-hydroxy-4-butoxyphenyl)-1,3,5-triazine, 2,4-di-p-tolyl-6-(2-hydroxy-4-hexyloxyphenyl)-1,3,5-triazine, 2,4-di-p-tolyl-6-(2-hydroxy-4-pentoxyphenyl)-1,3,5-triazine, 2,4-di-p-tolyl-6-(2-hydroxy-4-octyloxyphenyl)-1,3,5-triazine, 2,4-di-p-tolyl-6-(2-hydroxy-4-benzyloxyphenyl)-1,3,5-triazine, and 2,4-di-p-tolyl-6-(2-hydroxy-4-(2-hexyloxyethoxy)phenyl)-1,3,5-triazine.

Many of the above-mentioned benzotriazole-type UV absorbents, benzophenone-type UV absorbents and triazine-type UV absorbents are contaminated with sulfonic acid group-having compounds that are derived from their starting materials and side materials. For example, Japanese Patent Publication No. 19027/1964 relating to 2-(2'-hydroxy-5'-t-octylphenyl)benzotriazole discloses a method for producing the compound, and says that a sulfonated castor oil is used as the starting material for the compound. To confirm this, we analyzed a commercially-available UV absorbent that comprises the compound, 2-(2'-hydroxy-5'-t-octylphenyl)benzotriazole, and have found that it contains 60 ppm (in terms of the sulfur atom) of a sulfur compound. To clarify the oxidative degradation of polycarbonates caused by the sulfur compound, we made an experiment with a model compound, and have confirmed the reproducibility of the experiment. The details of the experiment are in the section of Examples to follow hereinunder.

Regarding benzophenone-type UV absorbents, referred to is the disclosure in Japanese Patent Laid-Open No. 62133/1983 that relates to 4,4'-dihydroxybenzophenone. In the method disclosed therein, the starting material used for producing the compound is a fluoroalkanesulfonic acid (concretely, trifluoromethanesulfonic acid or difluoromethanemethanesulfonic acid). Also referred to is the disclosure in Japanese Patent Laid-Open No. 235839/1990 that relates to production of 2,4-dihydroxybenzophenone. In this, used is an alkylbenzenesulfonic acid that serves as a reaction promoter.

Regarding triazine-type UV absorbents, referred to is Japanese Patent Laid-Open No. 87638/1998 in which is used a solution of aminostilbenzenesulfonic acid or disodium 4'-diaminostilbenzene-2,2'-disulfonate for producing the compounds.

The polycarbonate resin composition of the present invention comprises 100 parts by weight of a polycarbonate and from 0.001 to 15 parts by weight, preferably from 0.005 to 10 parts by weight of the above-mentioned benzotriazole-type UV absorbent and/or benzophenone-type UV absorbent, and the sulfur content of the composition is at most 50 ppb, preferably at most 30 ppb.

If the UV absorbent content of the resin composition is smaller than 0.001 parts by weight, the resin composition could not have good weather resistance. On the other hand, even if the UV absorbent content is larger than 15 parts by weight, it will be no more effective for further improving the resin composition. If the sulfur content of the resin composition is over 50 ppb, the sheet moldings of the composition will have many gels (fish eyes). Therefore, the sulfur content of the resin composition must be reduced. For reducing the sulfur content, for example, employable is purification through recrystallization.

In addition to the above-mentioned benzotriazole-type UV absorbent and benzophenone-type UV absorbent, the polycarbonate resin composition of the invention may optionally contain a hindered amine-type light stabilizer that is synergistic with the UV absorbents, and also a phenolic or phosphorus-containing antioxidant, as well as other various additives such as flame retardant, release agent, antistatic agent, lubricant, etc., not interfering with the object of the invention.

[Polycarbonates]

As having the advantages of good heat resistance, impact resistance and stiffness, aromatic polycarbonates are preferred for use in the invention. They may be not only aromatic homopolycarbonates but also various copolymers including, for example, aromatic-aliphatic copolycarbonates, aromatic polycarbonate-polysiloxane block copolymers, etc. Of such various types of polycarbonates, aromatic homopolycarbonates are more preferred for use in the invention as they are easy to produce on a mass-production scale and have good quality and well-balanced physical properties.

In general, aromatic homopolycarbonates are produced in a well-known process which comprises reacting a biphenol such as typically bisphenol A and a polycarbonate precursor such as phosgene or a carbonate compound (e.g., diphenyl carbonate). For example, in a solvent such as methylene chloride and in the presence of a known acid acceptor or a molecular weight-controlling agent and optionally a branching agent, a biphenol is reacted with a carbonate precursor such as phosgene, or transesterified with a carbonate precursor such as diphenyl carbonate to give aromatic homopolycarbonates.

The molecular chain of the thus-produced polycarbonates is terminated with a molecular weight-controlling agent such as phenol, p-t-butylphenol, octylphenol, cumylphenol, etc. In general, therefore, the polycarbonates have no hydroxyl terminals. However, in case where the reaction for polycondensation is unbalanced, the polycarbonates produced will often have hydroxyl terminals derived from the starting monomer (biphenol).

The polycarbonate to be in the polycarbonate resin composition of the invention is preferably such that the proportion of the number of terminal hydroxyl groups therein to 100 polymer chain terminals (in general, one polymer has two terminals) is at most 10 mol %, more preferably at most 8 mol % (this is referred to as terminal hydroxyl molar fraction). If its terminal hydroxyl molar fraction is larger than 10 mol %, the polycarbonate will form many gels (fish eyes) when heated. In particular, when it contains a sulfur compound derived from the above-mentioned UV absorbent, the polycarbonate forms many colored gels (fish eyes).

The molecular weight of the polycarbonate for use in the invention is preferably so controlled that the polycarbonate can be well molded into sheets. Concretely, the viscosity-average molecular weight of the polycarbonate falls between 10,000 and 50,000, preferably between 12,000 and 35,000, more preferably between 15,000 and 30,000. If its molecular weight is smaller than 10,000, the polycarbonate will have poor impact resistance; but if larger than 50,000, the polycarbonate will be difficult to mold.

[Sheet Moldings]

The polycarbonate resin composition of the invention can be molded into sheets in a mode of extrusion molding, and the sheets have good weather resistance and heat resistance. The sheets can be formed into various types of moldings in a mode of vacuum forming, etc. As being resistant to heat, the sheet moldings are used for pouches or containers for retortable foods, and therefore must not have colored gels (fish eyes). Accordingly, the sheet moldings of the polycarbonate resin composition of the invention are favorable for pouches or containers for retortable foods.

EXAMPLES

The invention is described in detail with reference to the following Examples.

Test methods employed in Examples are mentioned below.

[1] Measurement of the Content of Sulfur Compound (in Terms of Sulfur Atom) in UV Absorbent or Polycarbonate Resin Composition Measured according to UV fluorophotometry (ASTM-D5453).

[2] Measurement of the Proportion of Terminal Hydroxyl Groups in Polymer Chain Terminals of Polycarbonate (Terminal Hydroxyl Molar Fraction)

Obtained from the integrated intensity ratio of the peak appearing at 6.7 ppm for the OH terminal structure to the peak appearing at 1.3 ppm for the p-tert-butylphenyl terminal structure in $^1$H-NMR.

[3] Weathering Test

A test piece is set in a sunshine weatherometer (weathering tester), and tested according to ASTM D1499. Precisely, it is tested therein at a temperature of 60° C.±5° C. and at a humidity of 60±10% RH for 1000 hours. Before and after the test, the yellowness of the test piece is measured according to JIS K7103.

[4] Heat Stability Test

One g of resin pellets is heated in a nitrogen atmosphere at a predetermined temperature (360° C., 380° C.) for a predetermined period of time (4 hours, 6 hours), and then dissolved in 13 ml of methylene chloride. This is then filtered through a 100-mesh metal gauze filter. The insoluble solid (gel) remained on the filter is dried in vacuum at 120° C. for 2 hours, and its weight is measured. This indicates the amount of the resin gel (% by weight).

On the other hand, the resin solution is put into a quartz cell having an optical path length of 5.7 cm, and its YI (yellow index) is measured with a color meter, Suga Tester's SM-3. Before and after the test, YI of the sample is measured, and the variation ΔYI is obtained from the data.

Examples 1 to 2 Comparative Example 1

To 100 kg (100 parts by weight) of bisphenol A polycarbonate flakes having a viscosity-average molecular weight (Mv) of 26900, added were a predetermined amount (shown in Table 1) of a UV absorbent, 2-(2'-hydroxy-5'-t-octylphenyl)benzotriazole, and 2000 ppm of an antioxidant, 3/1 mixture of tris(2,4-di-t-butylphenyl) phosphite/octadecyl 3-(3,5-di-t-butyl-4-hydroxyphenyl)propionate. In Comparative Example 1, the UV absorbent used is a Sun Chemical's commercial product, UV5411 having a sulfur content of 60 ppm; and in Examples 1, 2 and 3, the commercial product was purified through recrystallization to lower its sulfur content to 5 ppm. The resulting mixture was pelletized through extrusion at 280° C. The resin pellets were molded through injection at 320° C. into test pieces having a thickness of 3 mm. The test pieces were tested for weather resistance. The pellets were tested for heat stability under the condition indicated in Table 1. The test results are given in Table 1.

Using a 65 mmφ extruder, the pellets were molded into sheets under the condition mentioned below. The sheets had a thickness falling between 0.9 and 1.0 mm.

Cylinder temperature: 280 to 340° C.
Gear pump temperature: 340° C.
Die temperature: 320° C.
Screw revolution: 30 to 40 rpm
Gear pump revolution: 12 rpm
Vacuum degree: 720 mmHg
Lip slit: 2.0 mm
First roll temperature: 120 to 130° C.
Second roll temperature: 130 to 140° C.
Third roll temperature: 175 to 185° C.
Take-up speed: 0.8 to 0.9 m/min After the sheet production with it under the condition mentioned above became stabilized, the extruder was continuously run for 5 hours. After 5 hours, the sheet was sampled, and the number of gels (fish eyes) seen on the sheet sample (20 cm×20 cm) was macroscopically counted. The data given in Table 2 indicate the number of gels per 10 g of the sheet.

[Purification Through Recrystallization]

The UV absorbent was purified by recrystallizing it in a solvent of ethanol, and the recrystallization was repeated twice or more.

Reference Example

To 100 kg of bisphenol A polycarbonate flakes having a viscosity-average molecular weight (Mv) of 26900, added was 60 ppb, in terms of the sulfur atom, of a sulfur compound, p-toluenesulfonic acid. The resulting mixture was pelletized through extrusion at 280° C. The resin pellets were molded through injection at 320° C. into test pieces having a thickness of 3 mm. The test pieces were tested for weather resistance. The pellets were tested for heat stability. The test results are given in Table 1.

TABLE 1

| | UV Absorbent | | S Content | Terminal OH Molar Fraction | Weather Resistance | Heat Stability | | Test Condition |
|---|---|---|---|---|---|---|---|---|
| | wt. pts. | (ppm) | (ppb) | (%) | ΔYI | ΔYI | Amount of Gel (wt. %) | |
| Example 1 | 0.2209 | 2200 | <11 | 8 | 5 | 55 | 0.5 | 360° C., 6 hrs |
| Comp. Ex. 1 | 0.2209 | 2200 | 132 | 13 | 6 | 55 | 0.9 | 360° C., 6 hrs |
| Example 2 | 0.2209 | 2200 | <11 | 0 | 5 | 90 | 0.1 | 380° C., 4 hrs |
| Example 3 | 0.2209 | 2200 | <11 | 8 | 5 | 90 | 0.8 | 380° C., 4 hrs |
| Reference Example | 0 | 0 | 60 | 13 | 6 | 120 | 5.2 | 380° C., 4 hrs |

TABLE 2

| Sheet | Number of Gels (fish eyes) (/10 g) |
|---|---|
| Sheet from Pellets of Example 1 | 1 |
| Sheet from Pellets of Comparative Example 1 | 5 |
| Sheet from Pellets of Example 2 | 0 |

Industrial Applicability

The resin composition of the invention has good weather resistance and good heat stability. As opposed to it, the resin composition of Comparative Example 1 has poor weather resistance and poor heat stability, since its sulfur content is high and since the terminal hydroxyl molar fraction of the polycarbonate therein is high.

What is claimed is:

1. A polycarbonate resin composition comprising (A) 100 parts by weight of a polycarbonate and (B) from 0.001 to 15 parts by weight of one or more UV absorbents selected from benzotriazole group-containing UV absorbents, benzophenone group-containing UV absorbents and triazine group-containing UV absorbents, wherein the sulfur content of the composition is at most 50 ppb.

2. The polycarbonate resin composition as claimed in claim 1, wherein the hydroxyl content of the terminals of the polymer chain of the polycarbonate (A) is at most 10 mol %.

3. A sheet molding of the polycarbonate resin composition of claim 1, which is produced through extrusion molding of the composition.

* * * * *